United States Patent [19]

Eckberg et al.

[11] Patent Number: 4,783,490
[45] Date of Patent: Nov. 8, 1988

[54] RADIATION ACTIVE SILICON COMPOUNDS HAVING AMIDE LIMITED MERCAPTAN FUNCTIONAL GROUPS

[75] Inventors: Richard P. Eckberg, Saratoga Springs; Karen D. Riding, Clifton Park, both of N.Y.

[73] Assignee: General Electric Company, Waterford, N.Y.

[21] Appl. No.: 80,724

[22] Filed: Jul. 31, 1987

[51] Int. Cl.$^4$ .................. C08F 2/50; C08G 75/04; C08G 77/20; C08G 77/28
[52] U.S. Cl. ..................................... 522/99; 556/419; 528/26; 528/30; 522/148; 522/172
[58] Field of Search .................. 522/99, 148, 172; 528/26, 30

[56] References Cited

U.S. PATENT DOCUMENTS

| | | | |
|---|---|---|---|
| 2,929,829 | 3/1960 | Morehouse | 528/26 |
| 3,278,484 | 10/1966 | Tesoro | 528/30 |
| 4,293,397 | 10/1981 | Sato et al. | 204/159.13 |
| 4,563,539 | 1/1986 | Gornowicz et al. | 556/421 |
| 4,707,503 | 11/1987 | Itoh | 522/99 |
| 4,725,630 | 2/1988 | Magee | 522/99 |

Primary Examiner—John C. Bleutge
Assistant Examiner—Arthur H. Koeckert

[57] ABSTRACT

Mercaptan substituted silicon compounds are produced by the reaction of amine with carboxyl. UV curable silicon compositions are produced from such compounds.

8 Claims, No Drawings

RADIATION ACTIVE SILICON COMPOUNDS HAVING AMIDE LIMITED MERCAPTAN FUNCTIONAL GROUPS

The present invention relates to radiation active silicon compounds having functional groups linked through an amide moiety. More particularly, the present invention relates to a process for producing radiation active silicon compounds through the reaction of amine with carboxyl.

BACKGROUND OF THE INVENTION

Commercially viable radiation-curable silicones for different coating applications have been the goal of recent research investigations. In the course of such investigations, there have been taught epoxysilicon/-'onium catalyst systems, U.S. Pat. Nos. 4,279,717 and 4,421,904; various acrylated and methacrylated silicones, U.S. Pat. Nos. 4,348,454 and 4,558,082; perbenzoate photocatalyzed silicone terpolymers, U.S. Pat. No. 4,558,147; and mercaptan vinyl type silicone polymers, U.S. Pat. No. 4,595,471, among others.

A radiation-curable silicone should be easy to produce, inexpensive to process, and "user friendly"; that is, present no special problems on application and cure if it is to be a commercially viable product. Seen in this light, epoxy silicones are high in cost, difficult to process, and have limited shelf stability in the presence of 'onium-type photocatalysts. Acrylated or methacrylated silicone compositions require efficient inerting of the UV-cure chamber for fast, fully developed cure. Mercaptan vinyl type silicone UV systems have excellent shelf stability and do not require inerting but are slow to cure and difficult to produce.

It is an object of the present invention to provide a simple and convenient method to produce a UV active silicon compound having mercaptan groups the method being characterized by the reaction of amine with carboxyl.

It is another object of the present invention to produce a UV active silicon compound having mercaptan groups linked to the silicon compound by an amide group.

It is yet another object of the present invention to provide a UV curable composition containing a silicon compound having mercaptan groups linked to the silicon compound by an amide group.

SUMMARY OF THE INVENTION

Briefly, there is provided by the present invention a method to produce mercapto substituted silicon compounds having the step of:

(a) amidizing an aminofunctionalsilicon compound of the formula:

$$\equiv Si-R-NH_2 \quad (1)$$

where R is a divalent substituted or unsubstituted hydrocarbon radical of from 1 to 12 carbon atoms, with a mercapto carboxylate of the formula:

$$HS-R^4-COOR^1 \quad (2)$$

where $R^4$ is a divalent substituted or unsubstituted hydrocarbon of from 1 to 12 carbon atoms and $R^1$ is —H or an alkyl group of from 1 to 4 carbon atoms.

There are further provided by this invention compounds resulting from the above method and UV curable compositions containing these compounds.

DETAILED DESCRIPTION OF THE INVENTION

The production of amine functional silicon compounds is well known. Suitable such compounds include amine functional silanes, siloxanes and polysiloxanes. Silanes and siloxanes are exemplified by beta-aminopropyltriethoxysilane, gammaaminopropyltrimethoxysilane, methyl-beta-(aminoethyl)-gammaaminopropyldimethoxysilane, omega-aminohexyltributoxysilane, beta-(aminoethyl)propytrimethoxysilane, beta-(aminoethyl)hexyltriethoxysilane, beta-(aminopropyl)-butyltributoxysilane, (trimethylsilylpropyl)ethylenediamine and (trimethylsilylisobutyl)ethylenediamine.

Aminofunctional polysiloxanes have been produced by various methods. In U.S. Pat. No. 2,947,771, to Bailey, aminofunctional silane is equilibrated with polysiloxane in the presence of alkali-metal hydroxide. In U.S. Pat. No. 3,598,853, to Friedman, an aminofunctional silane is condensed with silanol terminated polydiorganosiloxane. U.S. Pat. Nos. 4,584,393 and 4,565,885 disclose the production of disiloxanes by contacting an acyclic olefinic silazane with a hydrosilation catalyst to form an intermediate which is hydrolyzed. Other methods of preparing siloxanes and polysiloxanes are described in U.S. Pat. Nos. 3,544,498, to Holdstock, et al.; U.S. Pat. Nos. 3,890,269, to Martin; 2,930,809, to Jex, et al.; 2,921,950, to Jex, et al.; 3,045,036, to Jex, et al.,; and 4,633,002, to Piskoti. The aminofunctional siloxanes and polysiloxanes described in these references and their methods of preparation are incorporated herein by reference.

Suitable R compounds of formula (1) above, include alkylene compounds, for instance, methylene, ethylene, propylene, butylene, cyclohexylene; arylene compounds, for instance, phenylene, methylphenylene; substituted alkylene, including, $$-CH_2CH_2CH_2NHCH_2CH_2-,$$

$$-CH_2CH_2-O-CH_2CH_2NHCH_2CH_2CH_2-,$$

$$-CH_2CH_2-S-CH_2CH_2-,$$

$$-CH_2CH_2N(CH_2CH_2NH_2)CH_2CH_2-,$$

etc. The R compound of formula (1) will principally depend upon the method chosen to prepare the aminofunctional silicon compound. For the sake of economy and simplicity, R of formula (1) is preferably ethylene or propylene.

Regardless of method of preparation or whether it is a silane, siloxane or a repeating unit of a polysiloxane, the aminofunctional silicon will have the general formula:

$$R_b^2(RNH_2)_a SiO_{(4-a-b)/2} \quad (3)$$

wherein $R^2$ is hydrogen or a substituted or unsubstituted hydrocarbon of from 1 to 12 carbon atoms; b is 0, 1, 2, or 3; a is 1, 2, 3 or 4, and R is given above. In the case of a silane, $a+b=4$; in the case of a siloxane, $a+b$ is less than or equal to 3, and formula (3) is combined with $(4-a-b)O_{\frac{1}{2}}R^1$ units where $R^1$ is H a substituted or unsubstituted alkyl group of from 1 to 4 carbon atoms; and in the case of polysiloxane, $a+b$ is less than or equal to 3;

and formula (3) is combined with other siloxane units. Other siloxane units have the formula:

$$R_d^2SiO_{(4-d)/2}$$

where d is 0, 1, 2 or 3 and $R^2$ is described above.

Of course, the aim of amidizing the aminofunctional silicon compound with the UV active carboxylate is to produce a means to cure or cross-link a material. Thus, the silane, siloxane or polysiloxane should have two or more aminofunctional groups for amidization. It is preferred for a silane or siloxane that a is 2 or greater, and for a polysiloxane that 2 or more repeating units of formula 3 be attached to each molecule. Of course, a can be 1 in the case of the silane or siloxane where, for instance, the silane or siloxane is to endcap a polymer or combine with another silane or siloxane to produce a multifunctional material.

Preferred polysiloxanes herein have a viscosity between about 5 and 100,000,000 centipoise at 25° C. Especially preferred polysiloxanes are of the type used in coatings, for example, U.S. Pat. Nos. 4,448,815 and 4,617,238, assigned to the assignee of the present invention and hereby incorporated by reference. Preferred polysiloxanes contain from about 0.1 to about 20% by weight aminofunctional groups, i.e. —R—NH$_2$.

In terms of formulas 1 and 2, the amidization reaction is schematically represented by:

$$\equiv Si-R-NH_2 + HS-R^4-COOR^1 \longrightarrow \tag{4}$$
$$\equiv Si-R-NH-CO-R^4-SH$$

producing a mercapto functional silicon compound.

The amidization reaction may be carried out with or without an acid catalyst at temperatures ranging from about 50° to 200° C. Depending on conditions, the reaction may be completed in from ½ to 6 hours.

Suitable mercapto carboxylates of formula (2) include beta-mercaptopropionic acid, 4-mercapto benzoic acid, mercapto caproic acid, etc. $R^4$ is accordingly exemplified in the above compounds. Persons skilled in the art may easily imagine others.

The resultant mercapto functional silicon compound is UV active and may be incorporated into a UV curable silicon composition as a cross-linking agent, as a polysiloxane with a cross-linking agent or variations of the above. It is necessary in UV curable silicon compositions herein that a reactive co-compound having —CR$^1$=CR$_1$H groups be present to provide the mercaptan with a co-reactant.

Reactive co-compound may be organic multi-acrylates and multi-methacrylates including 1, 6-hexanediol diacrylates, neopentylglycol diacrylate, trimethylol propane triacrylate, cyclohexyl acrylate, etc. Additional reactive co-compound may be acrylate and methacrylate substituted polysiloxane, as disclosed in U.S. Pat. No. 4,348,454; 4,558,082; 4,558,147; and 4,640,967, hereby incorporated by reference. Other such co-compounds might include polyalkenyls such as divinyl benzene and vinyl substituted polysiloxane.

At stated above, if the UV active silicon compound herein is to be crosslinking agent or is to be crosslinked, there should be at least two active mercaptans on each molecule. Of course a polysiloxane has the capacity to contain several active mercaptans on a single molecule. The weight of active mercaptan groups, —R—NH—CO—R$^4$—SH, is preferably the weight equivalent to the weight of siloxane bonded aminofunctional groups present originally and stated above to be about 0.1 to about 20% by weight.

UV curable silicone compositions containing the mercapto substituted silicon compounds herein should contain at least one co-reactant group for each mercaptan. In other words, there should be at least one —CR$^1$=CR$_1$H for each —SH. Due to the tendency of the co-reactive groups to self react, under cure conditions it is preferred to have at least two co-reactive groups for each mercaptan.

Formulating the curable silicon composition requires that the UV active silicon compound be mixed with an effective amount of free radical initiator.

A variety of radical generators may be used including peroxides and azo compounds. Preferred photoinitiators are disclosed by Edwards, et al., U.S. Pat. No. 3,211,705, Hatanaka, et al., U.S. Pat. No. 4,451,634 and Eckberg, et al., U.S. Pat. No. 4,558,147, hereby incorporated by reference.

Briefly, Eckberg, et al., disclose certain perbenzoate esters having the general formula:

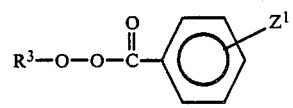

wherein $R^3$ is a monovalent alkyl or aryl group and $Z^1$ is hydrogen, alkyl, halogen, nitro, amino, or amido. The nature of the $Z^1$ substituent will affect the stability of the peroxy bond; an electron-poor substituent stabilizing the peroxy bond and an electon-rich substituent making the peroxy bond more reactive. These perbenzoate esters may be synthesized in known ways, such as by reacting benzoyl halides with hydroperoxides (see e.g. the descriptions in Blomquist and Bernstein, J. Amer. Chem. Soc., 73, 5546 [1951]). Preferred perbenzoate esters include t-butylperbenzoate and its para-substituted derivatives, t-butylper-p-nitrobenzoate, t-butylper-p-methoxybenzoate, t-butylper-p-methylbenzoate and t-butylper-p-chlorobenzoate.

In addition to t-butylperbenzoate and its derivatives as photoinitiators, Eckberg et al. disclose that the inclusion of certain photosensitizers enhances reactivity. The photosensitizers are polyaromatic compounds possessing the

chromophone, where Ph is phenyl, and having at least two benzene rings which may be fused or bridged by organic radicals or hetero-radicals such as oxa, thio and the like. Preferred photosensitizers are benzophenone, acetophenone, and t-butylanthraquinone.

Edwards, et al., teach certain azo compounds as being superior to either peroxides or ultraviolet radiation. A preferred azo compound is azo diisobutyronitrile.

Other photoinitiators, whose suitability for use in a particular situation can easily be ascertained by the artisan, are described in U.S. Pat. Nos. 3,759,807, 3,968,305, 3,966,573, 4,113,592, 4,131,529, 4,130,600, and 4,348,462. All of these patents are incorporated by reference into the instant disclosure for their teachings related to photoinitiators.

The amount of photoinitiator employed is not critical so long as addition of the mercaptan to the unsaturated hydrocarbon is achieved. As with any catalyst, it is preferable to use the smallest effective amount possible. Generally, the amount of photoinitiator is at least one part by weight and, preferably, can be anywhere from about 1 to about 10 parts by weight based on 100 parts by weight of polysiloxane (A). More preferably, the photocatalyst level is from about 1 to about 5 parts by weight per 100 parts by weight polysiloxane (A).

A diluent may optionally be added where it is desirous to reduce viscosity. Suitable diluents include reactive diluents such as styrene, acrylamide, acrylonitrile, methyl acrylate, methyl methacrylate, 2-ethylhexyl acrylate, etc. Viscosity is to be controlled through addition of the reactive diluent but generally it is not desirable to add more than about 25% by weight reactive diluent. Non-reactive diluents may be employed but are not preferred for environmental reasons.

As above, these compositions may be formulated for application to glass fiber, for application to paper substrates as a release coating and so on. Curing may be accomplished by simple exposure to sufficient UV radiation, augmented by final cure at room temperature or elevated temperature. Of course, the combination of elevated temperature and UV radiation exposure will produce the most rapid cure.

In order that those skilled in the art might be better able to practice the present invention, the following examples are given by way of illustration and not by way of limitation. All parts are by weight unless otherwise indicated.

EXAMPLES

Example 1

An aminofunctional polydimethylsiloxane was prepared by equilibration of 2500 grams bis(gamma-aminopropyldimethyl)disiloxane with 7521 grams octamethylcyclotetrasiloxane with tetramethyl ammonium hydroxide. Following removal of the light ends, a silicone polymer was obtained which corresponded to the structure:

$H_2N(CH_2)_3(CH_3)_2SiO-((CH_3)_2SiO)_{12}-Si(CH_3)_2(CH_2)_3NH_2$.

Example 2

120 grams of polymer from Example 1 (0.22 moles amine function) were dispersed in 120 grams xylene with 30 g B-mercapto propionic acid (0.28 moles). The mixture was brought to 145° C. reflux for 2 hours at which time 4.4 cc H$_2$O was trapped out in a Dean-Stark trap. Stripping the reaction product to 170° C., 50 mm vacuum afforded a 136 gram yield (139 gram theoretical) of clear, orange fluid product, viscosity 1060 cps., $N_{25}^D=1.4408$. Infrared analysis of 479-1944 product revealed amide N—H stretch at 3300 cm$^{-1}$, amide NH bend at 1550 cm$^{-1}$, and carbonyl C=O stretch at 1645 c$^{-1}$. These peaks were absent in the infrared spectrum of the polymer of Example 1, and are consistent with the structure:

$HS(CH_2)_2CONH(CH_2)_3(CH_3)_2SiO((CH_3)_2SiO)_{12}-Si(CH_3)_2(CH_2)_3-NHCO(CH_2)_2SH$

Example 3

2 grams of the mercaptan substituted silicone of Example 2 was mixed with 7 grams of an acrylated epoxy silicone containing about 5 mole % of acrylic functionality and prepared in accordance with U.S. Pat. No. 4,558,082. 3 weight % Darocure ®-1173 photoinitiator, 2,2-dimethyl-2-hydroxyacetophenone, plus 3 weight % diisopropylaminoethanol photosynergist were added, providing a clear coating bath. This coating composition was applied to an aluminum Q panel as a 2 mil thick coating, then exposed to 400 watts/inch total focused UV lamp radiation (medium pressure mercury vapor sources) for 0.3 seconds in air curing environment. A smear-free cured coating was obtained which adhered well to the aluminum substrate. The acrylated epoxysiicone polymer with the same photo initiators failed to cure under these same conditions without polymer from Example 2 present.

Example 4

6.3 grams of the mercaptan substituted silicone from Example 2 was mixed with 1 gram sym-tetramethyltetravinylcyclotetrasiloxane plus the photoinitiator package of Example 3. A clear coating was obtained which, when applied as a 2 mil thick coating on aluminum cured to a migration-free surface when irradiated with 600 watts/inch total lamp power for 0.6 seconds. The same coating required but 0.3 seconds exposure to cure to an abhesive surface when applied as a thin (<0.2 mil) coating on supercalendered Kraft substrate. The cyclic vinyl siloxane cannot be cure by radiation independent of a mercaptan-containing species.

What is claimed is:

1. A UV curable silicon composition comprising:
   (a) a mercapto substituted silicon compound comprising UV active moieties of the formula:

≡Si—R—NHCO—R$^4$—SH where R and R$^4$ are independently divalent substituted or unsubstituted hydrocarbon radicals of from 1 to about 12 carbon atoms;
   (b) an effective amount of a free radical type photoinitiator; and
   (c) a reactive co-compound having —CR$^1$=CR$_1$H groups where R$^1$ is hydrogen or a substituted or unsubstituted alkyl group of from 1 to 4 carbon atoms.

2. The composition of claim 1 wherein there are at least one —CR$^1$=CH$_2$ groups for each —SH.

3. The composition of claim 1 wherein there are at least two —CR$^1$=CR$_1$H groups for each —SH.

4. The composition of claim 1 which further contains a reactive diluent.

5. The composition of claim 1 wherein said mercapto substituted silicon compound is a silane.

6. The composition of claim 1 wherein said mercapto substituted silicon compound is a siloxane or polysiloxane.

7. The composition of claim 6 wherein said polysiloxane has a viscosity between about 5 and 100,000,000 centipoise at 25° C. and comprises units of the formula:

$R_d^2SiO_{(4-d)/2}$ wherein d is 0, 1, 2 or 3 and $R^2$ is hydrogen or a monovalent substituted or unsubstituted hydrocarbon radical of from 1 to about 12 carbon atoms.

8. The composition of claim 7 wherein said polysiloxane contains active mercaptan groups by weight equivalent to about 0.1 to about 20% by weight of siloxane bonded aminofunctional groups.

* * * * *